(12) United States Patent
Fink et al.

(10) Patent No.: US 9,517,831 B2
(45) Date of Patent: Dec. 13, 2016

(54) ROTARY WING AIRCRAFT AIRFRAME

(71) Applicant: AIRBUS HELICOPTERS DEUTSCHLAND GMBH, Donauworth (DE)

(72) Inventors: Axel Fink, Donauworth (DE); Christoph Steindl, Neusaess (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 86 days.

(21) Appl. No.: 14/546,325

(22) Filed: Nov. 18, 2014

(65) Prior Publication Data

US 2015/0136906 A1 May 21, 2015

(30) Foreign Application Priority Data

Nov. 20, 2013 (EP) .................................. 13400030

(51) Int. Cl.
*B64C 1/06* (2006.01)
*B64C 1/20* (2006.01)
(Continued)

(52) U.S. Cl.
CPC ............. *B64C 1/18* (2013.01); *B64C 1/062* (2013.01); *B64D 37/04* (2013.01); *B64D 37/06* (2013.01); *B64C 27/04* (2013.01); *Y02T 50/44* (2013.01)

(58) Field of Classification Search
CPC ............ B64C 1/18; B64C 1/062; B64C 27/04; B64C 27/00; B64C 1/20; B64C 1/06; B64D 37/04; B64D 37/06; E04C 3/29; E02D 29/1463; E04F 15/02452; E04F 15/02458; E04B 5/43; E04B 1/348; E04B 1/34807
(Continued)

(56) References Cited

U.S. PATENT DOCUMENTS 3,652,050 A  3/1972  Marrujo et al.
6,427,945 B1 8/2002  Bansemir
(Continued)

FOREIGN PATENT DOCUMENTS

DE  3049429  7/1982
EP  2455285  5/2012

OTHER PUBLICATIONS

Extended European Search Report for EP 13400030.5, Completed by the European Patent Office, Dated Apr. 11, 2014, 6 Pages.
(Continued)

*Primary Examiner* — Tien Dinh
*Assistant Examiner* — Vicente Rodriguez
(74) *Attorney, Agent, or Firm* — Brooks Kushman P.C.

(57) ABSTRACT

A rotary wing aircraft airframe (2) with a longitudinal axis comprising: a subfloor structure (15) for supporting cabin floor panels (13) and/or at least one fuel tank bladder (12). Said subfloor structure (15) has a bottom shell (16), longitudinal support beams (21), ribs (20), main frames (23) and floor panels (13). The bottom shell (16) has a flat shell portion (17) and two lateral shell portions (18) extending integrally from said flat shell portion (17) along its longitudinally oriented sides and being curved towards respective front edges of said ribs (20) and main frames (23). The longitudinal support beams (21) are provided with attachments for the floor panels (13), the longitudinal support beams (21) are attached at least partially to the ribs (20) and/or the main frames (23) and the longitudinal support beams (21) are featuring along at least ⅔ of their longitudinal extension a height 2 to 20 times smaller than any distances of any of the floor panels (13) to the bottom shell (16).

20 Claims, 9 Drawing Sheets

(51) Int. Cl.
  *B64C 27/00*  (2006.01)
  *B64C 1/18*  (2006.01)
  *B64D 37/04*  (2006.01)
  *B64D 37/06*  (2006.01)
  *B64C 27/04*  (2006.01)

(58) Field of Classification Search
  USPC ........................................................ 52/64, 70
  See application file for complete search history.

(56) References Cited

U.S. PATENT DOCUMENTS

| | | | | |
|---|---|---|---|---|
| 6,554,225 | B1* | 4/2003 | Anast | B64C 1/18 |
| | | | | 105/422 |
| 6,959,894 | B2* | 11/2005 | Hayashi | B64C 1/062 |
| | | | | 188/377 |
| 7,845,594 | B2* | 12/2010 | Poggi | B64C 1/062 |
| | | | | 244/117 R |
| 7,874,516 | B2* | 1/2011 | Cacciaguerra | B64C 1/061 |
| | | | | 244/119 |
| 8,047,465 | B2* | 11/2011 | Payen | B64C 1/062 |
| | | | | 244/119 |
| 2010/0102171 | A1* | 4/2010 | Osorio | B64C 1/18 |
| | | | | 244/129.1 |
| 2012/0112004 | A1* | 5/2012 | Tanaka | B64C 1/062 |
| | | | | 244/119 |

OTHER PUBLICATIONS

Coppinger., Structures 2005, vol. 167, No. 4982, p. 26, XP-001227208, "Composites soften impact".

\* cited by examiner

ROTARY WING AIRCRAFT AIRFRAME

CROSS REFERENCE TO RELATED APPLICATION

This application claims priority to European patent application No. EP 13 400030.6 filed on Nov. 20, 2013, the disclosure of which is incorporated in its entirety by reference herein.

BACKGROUND OF THE INVENTION (1) Field of the Invention

The invention relates to an airframe with a subfloor structure, for a rotary wing aircraft.

(2) Description of Related Art

The subfloor structure of a rotary wing aircraft is arranged within the lower part of the airframe between the cabin floor level and the outer loft of the rotary wing aircraft. Typically, a subfloor structure comprises a bottom shell, floor panels and a framework construction which connects to the floor and the bottom shell. For typical architectures, the framework comprises interconnected longerons and ribs as well as the lower portions of the main frames.

The longerons are generally planar longitudinal beam elements being basically arranged along the longitudinal axis of the aircraft and spanning straightforward upwards the entire length of the subfloor structure, whereas the ribs are generally planar crossbeams which are basically arranged orthogonally to the longitudinal aircraft axis and span straightforward upwards the whole subfloor width at their respective location. Both, the longerons and the ribs extend from the bottom shell to the floor plane and are basically flat stiffened webs with two caps arranged at both longitudinal borders of the web.

Hence, the framework adopts an orthogonal waffle grid configuration with numerous intersections. The flat webs of both the longerons and the ribs are basically perpendicular to the floor plane. The tasks of the subfloor structure are manifold. The subfloor structure takes on the one hand the payload loads and transmits them to the main frames.

On the other hand, the subfloor structure houses electrical and mechanical systems and the fuel tanks and further provides for substantial kinetic energy absorption in case of a crash scenario. The longerons confine, together with corresponding crossbeams, the fuel tank compartments in which elastomeric bladders are installed. Typically, lateral volumes enclosed between the longerons and curved side shells of the bottom shell are used for systems housing.

The document U.S. Pat. No. 6,959,894 discloses an impact resistant structure of a rotary wing aircraft, which includes: an energy absorber positioned under a floor of the rotary wing aircraft and directly connected to a cabin frame of the rotary wing aircraft. The energy absorber is arranged in accordance with a distribution of a ground reaction force on a general ground at a time of crash situation. Another aspect of the present invention provides an energy absorber, which includes: a plurality of independent hollow tubes of fiber reinforced composite material integrally formed by bundling only the hollow tubes. The hollow tubes are arranged so as to reduce a number of intersecting wall surfaces of the hollow tubes.

The document EP2455285 describes a shock absorbing structure for a helicopter. The shock absorbing structure is miniaturized by providing a beam-like member having a recess and a shock absorbing member. One end of the shock absorbing member is arranged in the inside of the recess and the other end of the shock absorbing member is arranged outside of the recess. The area of the recess overlaps the place where the structure member supports the structure even at a dead-stroke in which the shock absorbing member is bottomed out.

The document U.S. Pat. No. 6,427,945 discloses a subfloor structure of an aircraft airframe, particularly of a helicopter, with longitudinal beams and crossbeams that intersect each other and are interconnected to form a grid that is fixedly attached to a floor and a bottom skin of the aircraft fuselage. Structural elements such as pyramid frustums and reinforcements are arranged on the beams. The longitudinal beams and the crossbeams each have a trapezoidal cross-section that is preferably open on the wider base side, closed by a spine web along the narrow side, and bounded laterally by inclined leg webs that extend downwardly from the spine web at an angle outwardly relative to each other. The subfloor structure grid effectively absorbs the energy of a crash impact having both axial or vertical as well as non-axial or lateral impact force components.

Other prior art documents were perused with respect to the invention, i.e., the documents: "Composites soften impact" (in Structures by Rob Coppinger, page 26, London, 2005), DE3049429 and U.S. Pat. No. 3,652,050.

BRIEF SUMMARY OF THE INVENTION

Following disadvantages are related to this design of the state of the art.

The framework of the impact resistant structure features numerous intersections. This leads to the design requirement of separating the longerons, the crossbeams and/or the main frames into several parts, which have to be individually manufactured and assembled. Each intersection hence leads to additional structural joints and an associated increase in structural complexity and production efforts in terms of e.g. tolerance management, quality assurance, assembly, sealing and production time. This finally translates to higher structural weight and production costs.

Both, the longerons and the bottom shell are load carrying. Both, the webs of the longerons and the curved side shells of the bottom shell have to be stabilized using additional stiffeners or a sandwich construction. The web of the longerons requires, however, a more pronounced stabilization due to its flat shape on the one hand and the transversal loading in the tank region—excited by the hydrostatic pressure of the fuel bladder—on the other.

Framework intersections are stiff and hard to be crushed, hence resulting in an ineffective use of the possible stroke of the subfloor and exciting larger crash loads on the upper airframe structure. Different solutions have been suggested in order to enhance the energy absorption capabilities of cruciform sections for crash-resistant structures, such as tubular elements placed in the intersections, which however increase the structural complexity and are deemed ineffective for non-purely axial load cases.

In the case of an impact or crash the tanks must be able to move, preferably laterally, to avoid rupturing. It is mandatory that the subfloor structure does not damage the fuel bladders after an impact and that there does not arise any leakage after a crash scenario. Having the tanks enclosed by stiff longerons, the risk of a bladder rupture after a crash is high.

Special attention has to be paid to the connection of the longerons to the bottom shell within the fuel tank region in order to avoid critical local stresses excited by the transverse loading due to fuel pressure and aggravated by inadequate stiffness proportions.

In view of the disadvantages mentioned above, it is an aim of the present invention to provide for a subfloor structure that simplifies the structural arrangement of main load bearing components, supporting elements and the fuel tanks and improves the overall structural airframe efficiency whilst ensuring adequate crash behavior.

The objective of the invention is to provide an airframe with an improved structural efficiency of a subfloor structure in terms of structural weight, design complexity, assembly work, manufacturing and overall production costs, whilst ensuring adequate crash behavior.

The solution is provided with a rotary wing aircraft airframe with the features of claim 1. Preferred embodiments of the invention are presented with the subclaims. The claim 13 defines a rotary wing aircraft according to the invention.

According to an embodiment the invention, the rotary wing aircraft has a longitudinal axis. The airframe comprises a subfloor structure to support cabin floor panels and/or at least one fuel tank bladder. Said subfloor structure has a bottom shell, longitudinal support beams, ribs, main frames and floor panels. Said ribs and main frames extend essentially in planes perpendicular to said longitudinal axis, with the longitudinal support beams, ribs and main frames each on one side of the bottom shell.

The floor panels are in an essentially horizontal plane essentially parallel to the longitudinal axis on the same side of the bottom shell as the ribs and main frames and mounted on flat top edges of the ribs and main frames opposite to the bottom shell. The bottom shell has a flat shell portion and two lateral shell portions extending integrally from said flat shell portion along its longitudinally oriented sides, said two lateral shell portions being each curved towards respective lateral borders/lateral caps of said ribs and main frames.

The longitudinal support beams are provided with attachments for the floor panels. The longitudinal support beams are as well attached at least partially to the ribs and/or the main frames and the longitudinal support beams are featuring along at least ⅔ of their longitudinal extension a height 2 to 20 times smaller than any distances of any of the floor panels to the bottom shell.

According to an embodiment at least in a central and an aft portion of the subfloor structure, no longerons are used for the inventive rotary wing aircraft airframe but longitudinal support beams. The difference is that the longerons of the state of the art go from the bottom shell to the floor plane, whereas the "longitudinal support beams" of the inventive rotary wing aircraft airframe do not cover that height entirely, but only partially. Namely the longitudinal support beams cover along at least ⅔ of their longitudinal extension a height which is 2 to 20 times smaller than any of the longerons of the state of the art. The longerons of the invention are functionally and physically integrated within curved lateral portions of the bottom shell without any interruptions.

The main load bearing capabilities of the subfloor structure are hence attributed to the bottom shell which is capable to take the overall subfloor loads and distribute them to the main frames and a central fuselage body. Doing so, the subfloor structure takes advantage of self-stabilizing effects of the curved shape of the side panels of the bottom shell. As a matter of fact, the load bearing capability of the longerons is integrated within the bottom shell of the inventive rotary wing aircraft airframe.

Since the longitudinal support beams have a smaller height in comparison to the height of longerons, the intersection and separation of both longitudinal beams and crossbeams along their entire web height is eliminated. The ribs now directly introduce their loads to the bottom shell and are supported by both, the bottom shell and the floor panels. The longitudinal support beams, featuring a height 2 to 20 times smaller than the distance between bottom shell and floor plane, are preferably arranged just below the floor panel at a location corresponding to a typical location of longerons and are attached to an upper portion of the ribs and main frames.

In a preferred embodiment of the invention the longitudinal tank support function of the longerons of a state of the art rotary wing aircraft airframe is assumed in the inventive airframe by a membrane which is longitudinally attached to the upper longitudinal support beams and to the bottom shell. The membrane is not attached to the frames and/or the ribs to ensure a purely two-dimensional loading of the membrane. The membrane is capable to laterally support a tank bladder, the membrane tension loading being excited by the hydrostatic pressure of the fuel and being reacted at said upper and lower membrane attachment lines.

The membrane features a bulgy shape, laterally protruding to the outside of the fuel compartment towards said two lateral shell portions with their free volume respectively at both sides of the subfloor structure. The membrane hence does not contribute to the overall load bearing behavior, e.g. with moments and shear loads,—in contrast to the typical longerons—and hence the membrane does not need to be stabilized.

According to a further preferred embodiment of the invention the membrane is made of non-rigid materials such as meshes, non-coated or coated fabrics and foils or of semi-rigid materials such as thin fiber reinforced plastic foils.

Advantages of the invention with regard to the prior art configurations are following:

By at least partly eliminating of the longerons along at least one longitudinal section of the airframe, in the central and/or aft portion of the subfloor structure, avoids the intersections between the ribs and the longerons. This eliminates on the one hand the need of structural joining and allows on the other hand for a higher integrability hence reducing the number of parts. As a result, the ribs can be made as single parts, and the main frames are not interrupted.

The structural simplification goes along with a considerable simplification of the manufacturing and the assembly process, which translates in reduced production costs.

The loads can be directly introduced to the main frames and the central airframe body. The self-stabilizing effect of the curved side shell is exploited.

The reduction of parts and of structural joining translates to considerably weight savings.

A bulgy shape of the membrane allows increasing the fuel volume, which in turn may allow for the reduction of the overall height of the subfloor structure hence resulting to a further potential of reducing structural weight. For instance, the bulgy shape is an upwardly transversal C shape having a hollow side turned towards the interior of subfloor structure.

The reduction of stiff cruciform intersections in the central and aft portion to intersections between the longitudinal support beams and the ribs/frames with a 2 to 20 times smaller height than any of the entire height intersections of the state of the art allows to increase the subfloor's stroke and hence the crash behavior. During crash the membrane deforms still holding the tank bladder without fragmenting or splitting and without representing any risk of damaging the tank bladder.

According to a further preferred embodiment of the invention longerons are provided, said longerons being functionally and physically integrated within said curved lateral shell portions of the bottom shell without any interruptions. With the load bearing capability of the longerons integrated within the bottom shell the intersections between the longitudinal beams and the crossbeams are eliminated. Hence the crossbeams according to the invention directly introduce their loads to the bottom shell and are supported by both the bottom shell and the floor panel.

According to a further preferred embodiment of the invention intermediate lateral ribs are provided between the end panels, the lateral curved shell portions and the longitudinal support beams mainly for support.

BRIEF DESCRIPTION OF THE SEVERAL VIEWS OF THE DRAWINGS

Embodiments of the invention are presented in the following description with reference to the attached drawings.

DETAILED DESCRIPTION OF THE INVENTION

Figure 1:
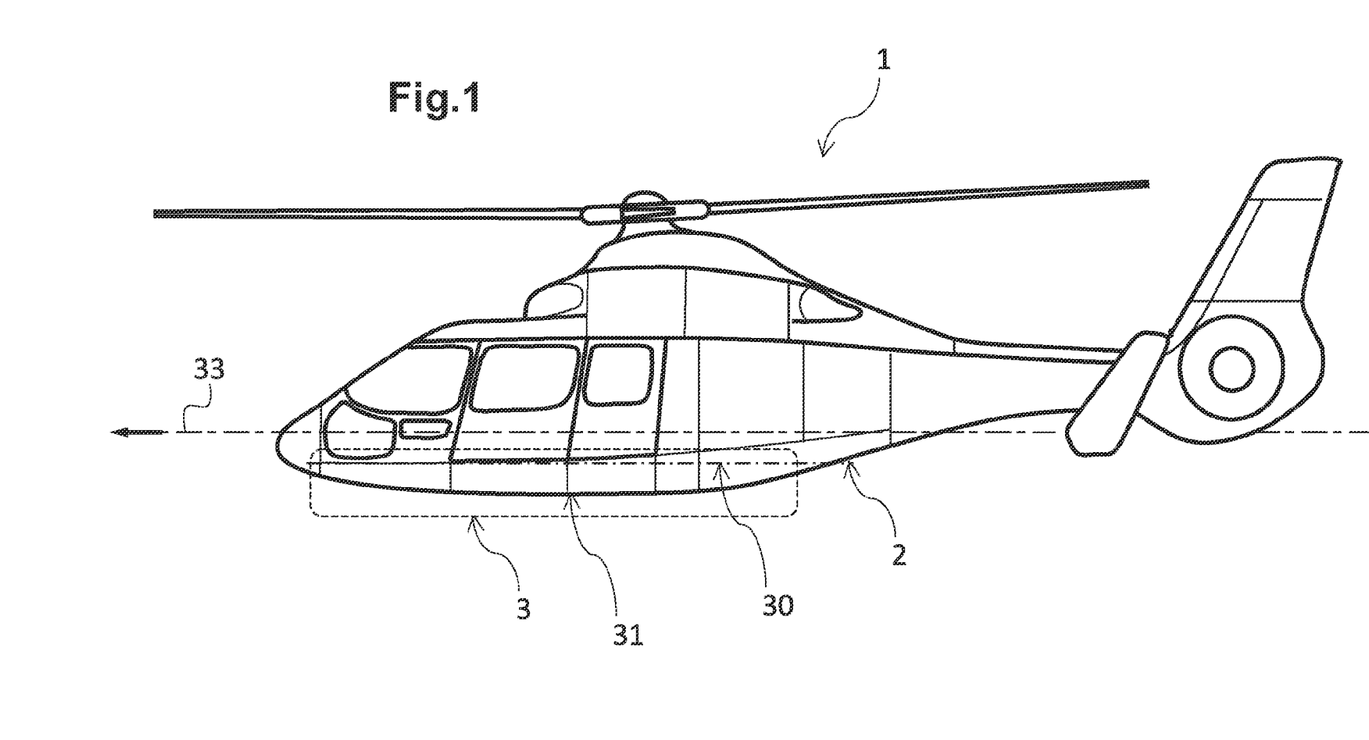
FIG. 1 shows a rotary wing aircraft of the helicopter type, to which the invention is typically applied.

According to FIG. 1 a rotary wing aircraft 1 is of the generic helicopter type. The rotary wing aircraft comprises an airframe 2 and a subfloor group 3 with a longitudinal axis 33. The subfloor group 3 is allocated within a lower part of the airframe 2 between a cabin floor level 30 and an outer loft 31 of the rotary wing aircraft 1.

Figure 2:
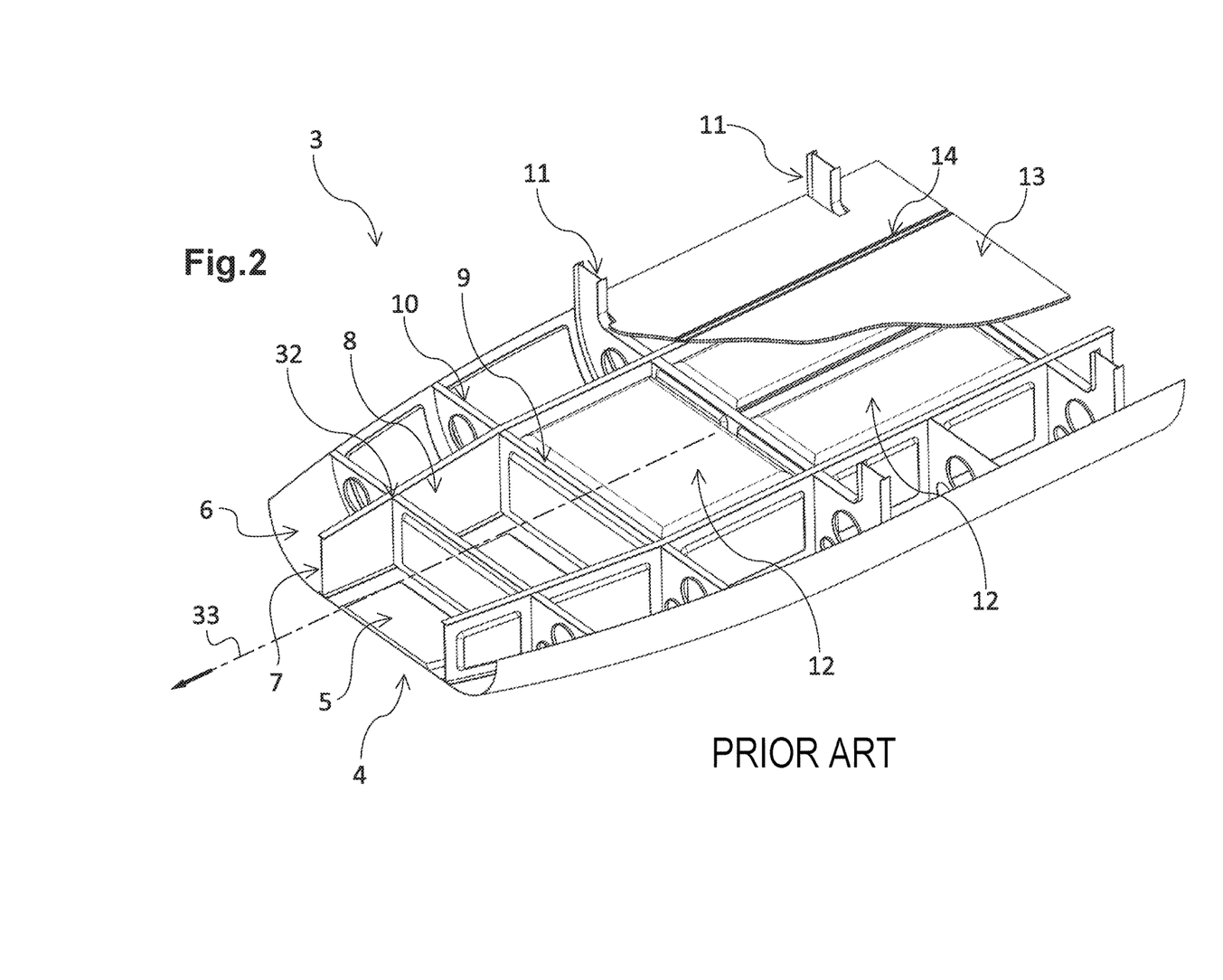
FIG. 2 shows a perspective view of a prior art subfloor structure of the rotary wing aircraft.

FIG. 2 shows a state-of-the-art subfloor group 3 is essentially symmetrical with regard to the longitudinal axis 33. Said subfloor group 3 is composed of a bottom shell 4 with an essentially flat or smoothly curved bottom shell portion 5 and two lateral curved side shell portions 6, integrated essentially longitudinally along said flat bottom shell portion 5. Said subfloor group 3 further comprises essentially symmetrical with regard to the longitudinal axis 33 a framework 7, main frames 11 and floor panels 13.

The framework 7 is built of longerons 8, basically extending longitudinally all along the subfloor group 3. The framework 7 is further built of central ribs 9 and lateral ribs 10, both being basically arranged orthogonally to the longerons 8, and usually being coincident in their longitudinal position. The central and lateral ribs 9, 10 are respectively essentially flat and arranged orthogonally to the floor panels 13. Seat rails 14 are arranged within the floor panels 13, their position being coincident with the longerons 8. The longerons 8 intersect with the ribs 9, 10 and the main frames 11, hence leading to numerous cruciform intersections 32. A highly loaded area represents the intersection of the main frames 11 and the longerons 8. Here, either the main frame 11 or the longerons 8 have to be interrupted which results to a highly loaded joint.

The longerons 8 and the central ribs 9 and the frames 11 delimit the tank area in which fuel tank bladders 12 are housed, being hence laterally and longitudinally supported by the longerons 8 and central ribs 9 or main frames 11 respectively. Volumes between the longerons 8 and the lateral curved side shell portions 6 are respectively used for systems integration.

Figure 3:
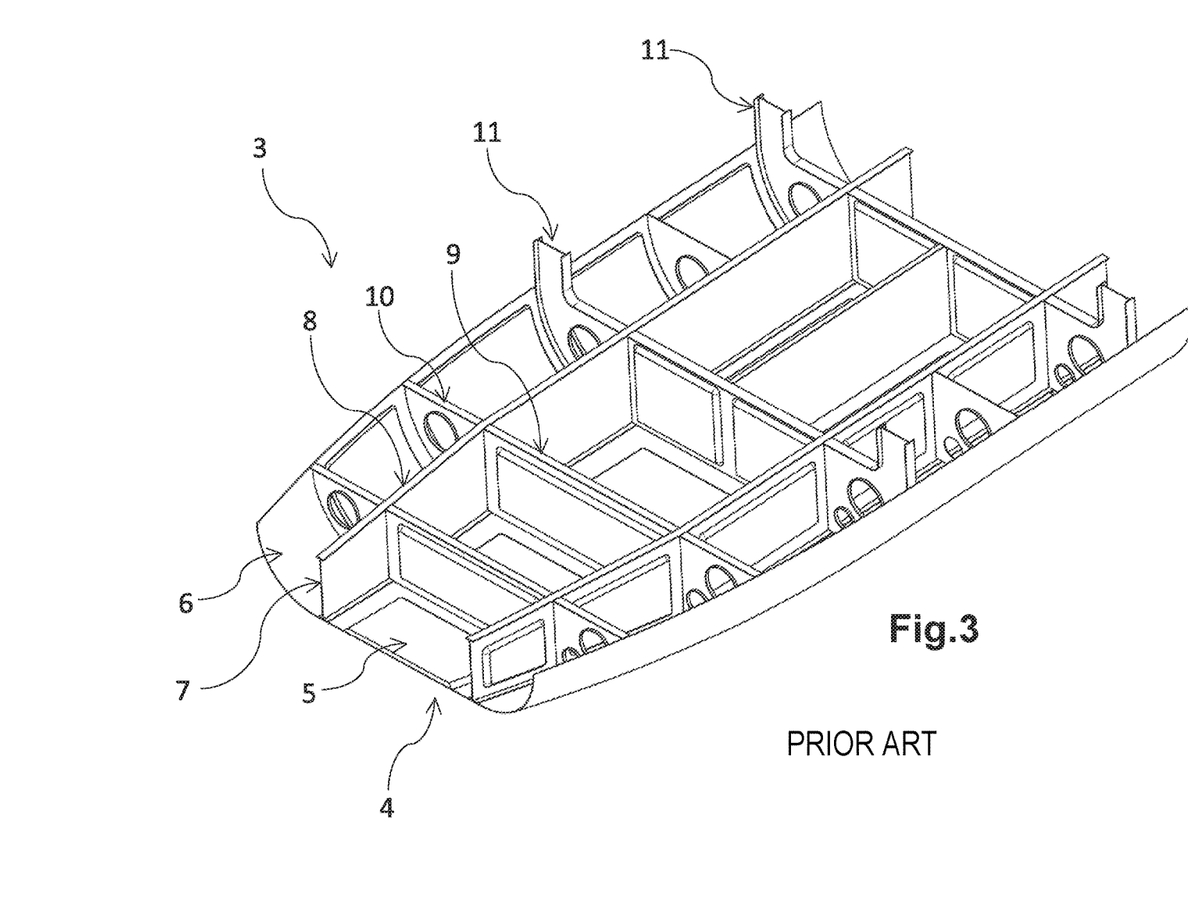
FIG. 3 shows a further perspective view of the prior art subfloor structure of FIG. 2.

FIG. 3 shows the subfloor group 3 of FIG. 2 without the tank bladders 12 and the floor panels 13 but with the orthogonal grid construction of the prior art framework.

Figure 4:
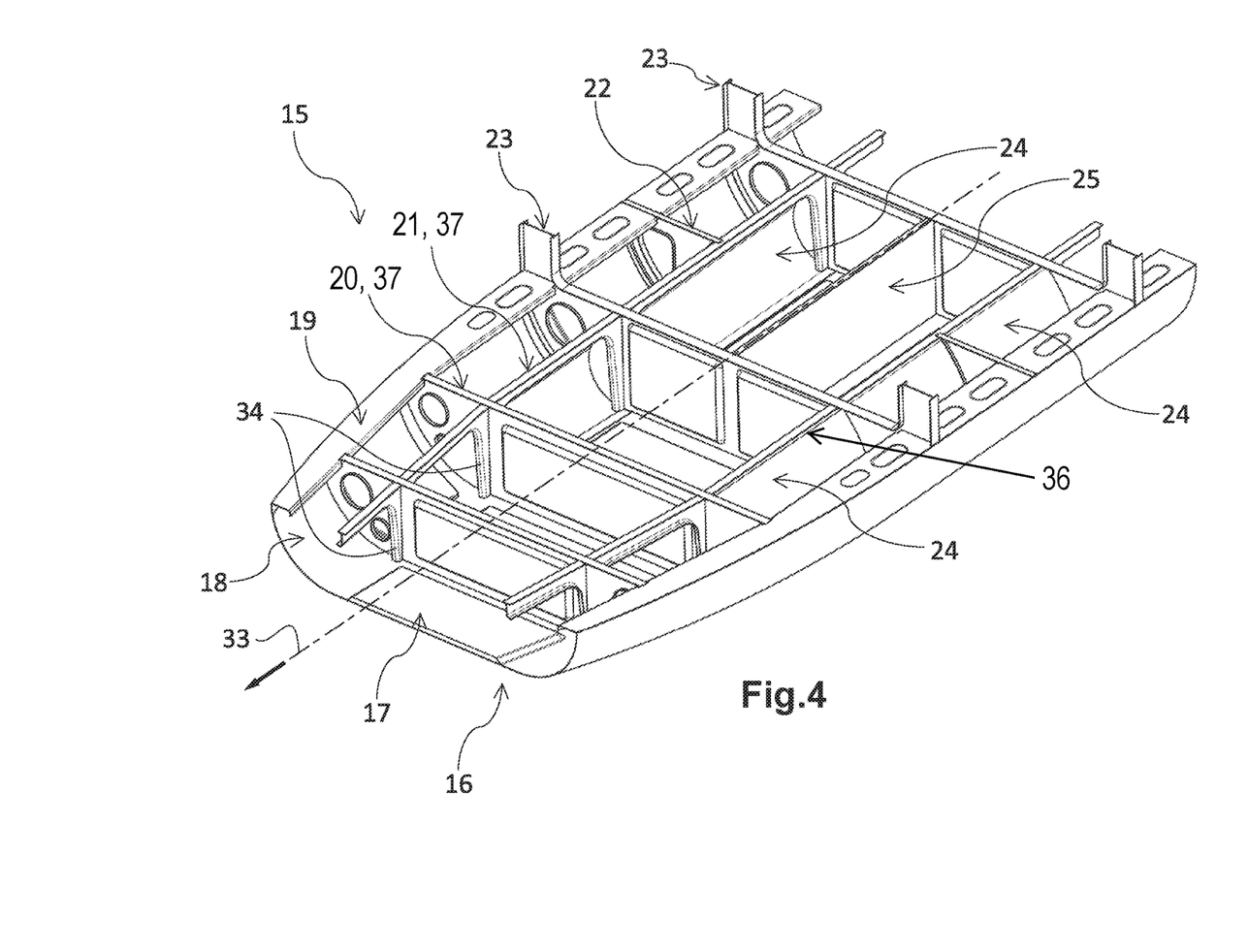
FIG. 4 shows a perspective view of an airframe having a subfloor structure according to the invention.

In FIG. 4 corresponding features are referred to with the references of FIGS. 1-3. Instead of longerons 8, the invention provides for longitudinal support beams 21. Instead of central ribs 9 and lateral ribs 10, the invention provides for single part ribs 20. The longitudinal support beams 21 and single part ribs 20 of the invention have flat top edges 37. An integral subfloor structure 15 comprises a main load carrying bottom integral shell 16 with an essentially flat shell portion 17 and two lateral shell portions 18, i.e. one of said two lateral shell portions 18 on each of both longitudinal sides of the flat shell portion 17. Continuous single-part ribs 20 and main frames 23 are arranged orthogonally to the longitudinal axis 33 of the aircraft. The ribs 20 are arranged orthogonally or slanted (not shown) with respect to the floor panels 13. The two lateral shell portions 18 extend integrally from said flat shell portion 17 along its longitudinally oriented sides and said two lateral shell portions 18 are curved towards respective lateral borders/lateral caps of said ribs 20 and main frames 23.

For stabilization purposes longitudinally extending end panels 19 are arranged at top ends of the lateral shell portions 18 essentially in the horizontal plane of the floor panels 13. Each end panel 19 is integral or riveted respectively with one of the two lateral shell portions 18 and is pointing towards an inside of the subfloor structure 15.

Longitudinal support beams 21 are provided with attachment 36 for floor panels as shown in FIG. 4. Longitudinal support beams 21 are attached to the lower side of the floor panels 13 and with front flanges 34 orthogonally to the ribs 20 and/or main frames 23. The front flanges 34 are oriented from the floor panels 13 towards the bottom shell 16. Alternatively, the longitudinal support beams 21 can be continuous, going through the rib's webs through cut-outs (not shown) and being attached to the ribs 20 by means of additional clips and/or brackets (not shown).

The height of the longitudinal support beams 21 is a fraction of the distance between the floor panels 13 and the bottom shell 16, i.e. the total subfloor height. Along at least ⅔ of the longitudinal extension of the longitudinal support beams 21 the height of the longitudinal support beams 21 is 2 to 20 times smaller than any distances between any of the floor panels 13 and the bottom shell 16.

Essentially longitudinally extending membrane elements 24 are attached between the longitudinal support beams 21 and the bottom shell 16. The two lateral shell portions 18 provide a free volume 29 with said longitudinally extending membrane elements 24 on each of both longitudinal sides of the subfloor structure 15.

Figure 5:
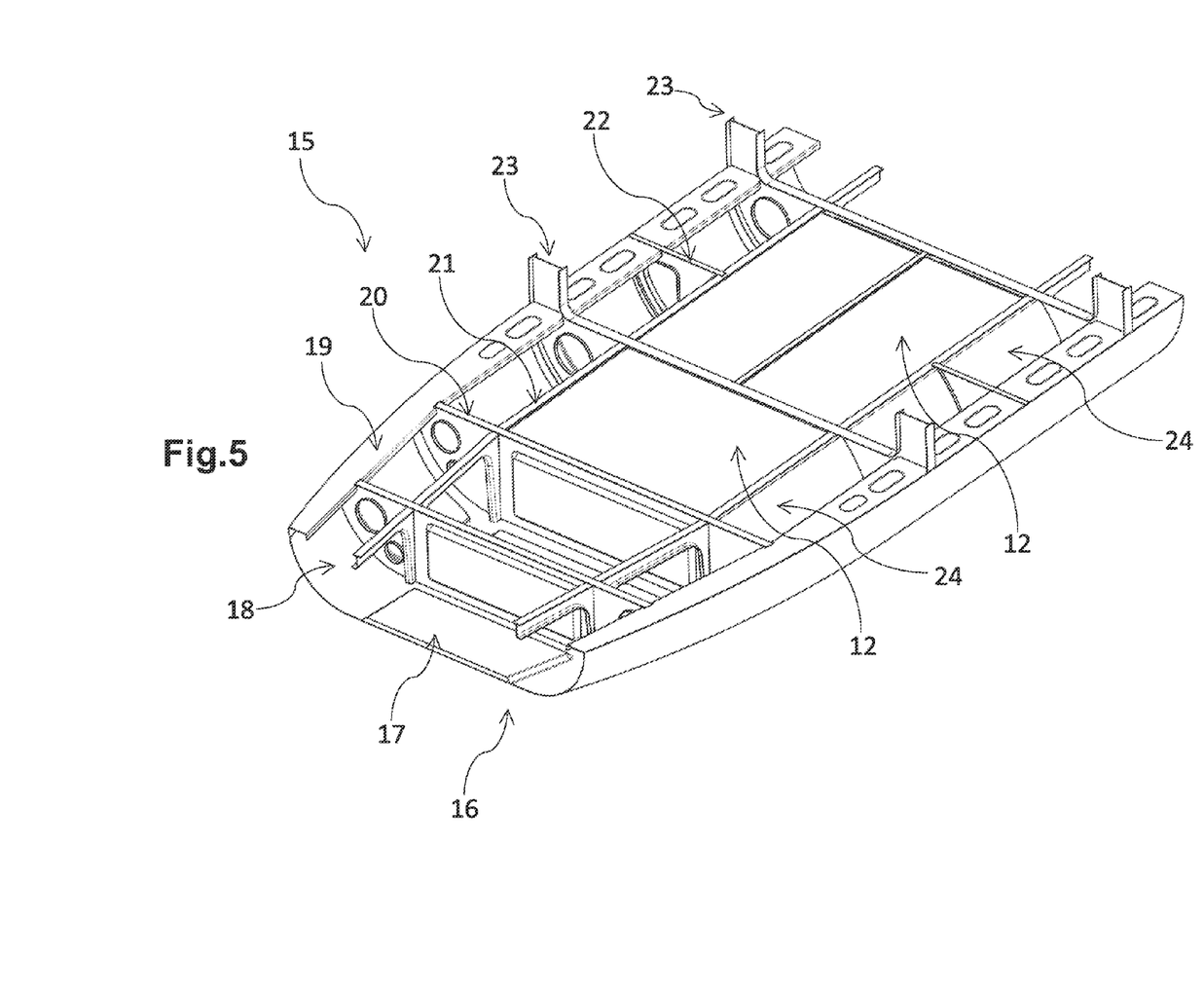
FIG. 5 shows a further perspective view FIG. 4.

According to FIG. 5 corresponding features are referred to with the references of FIGS. 1-4. The integral subfloor structure 15 comprises the tank bladders 12 allocated between the main frames 23 and/or ribs 20 and the membrane elements 24.

Figure 6:
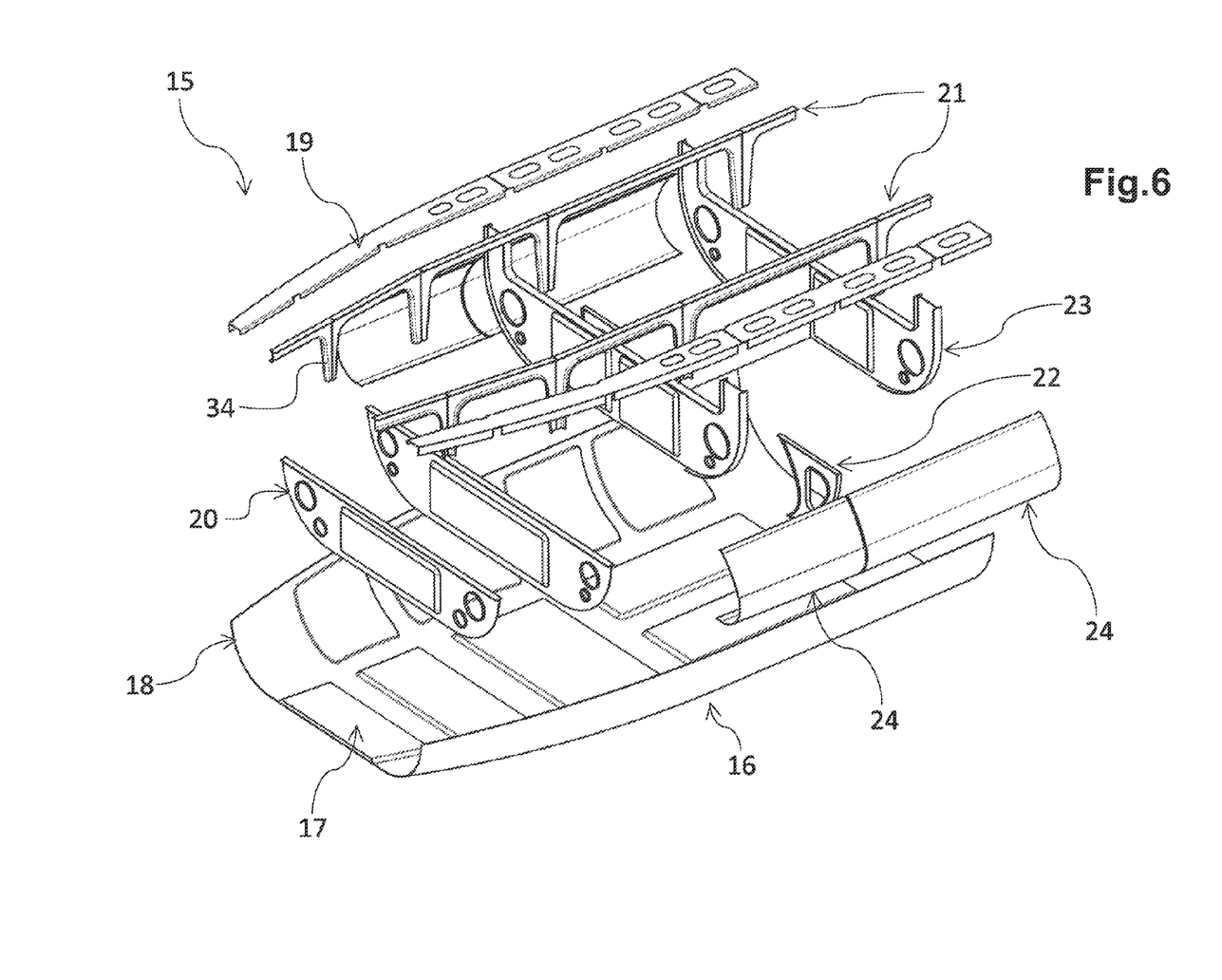
FIG. 6 shows an exploded perspective view of a longitudinal section of an airframe devoid from longerons according to the invention.

According to FIG. 6 corresponding features are referred to with the references of FIGS. 1-5. The integral subfloor structure 15 allows a bulgy shape of the membrane elements 24, as well as the continuity of the ribs 20 and the main frames 23.

Figure 7:
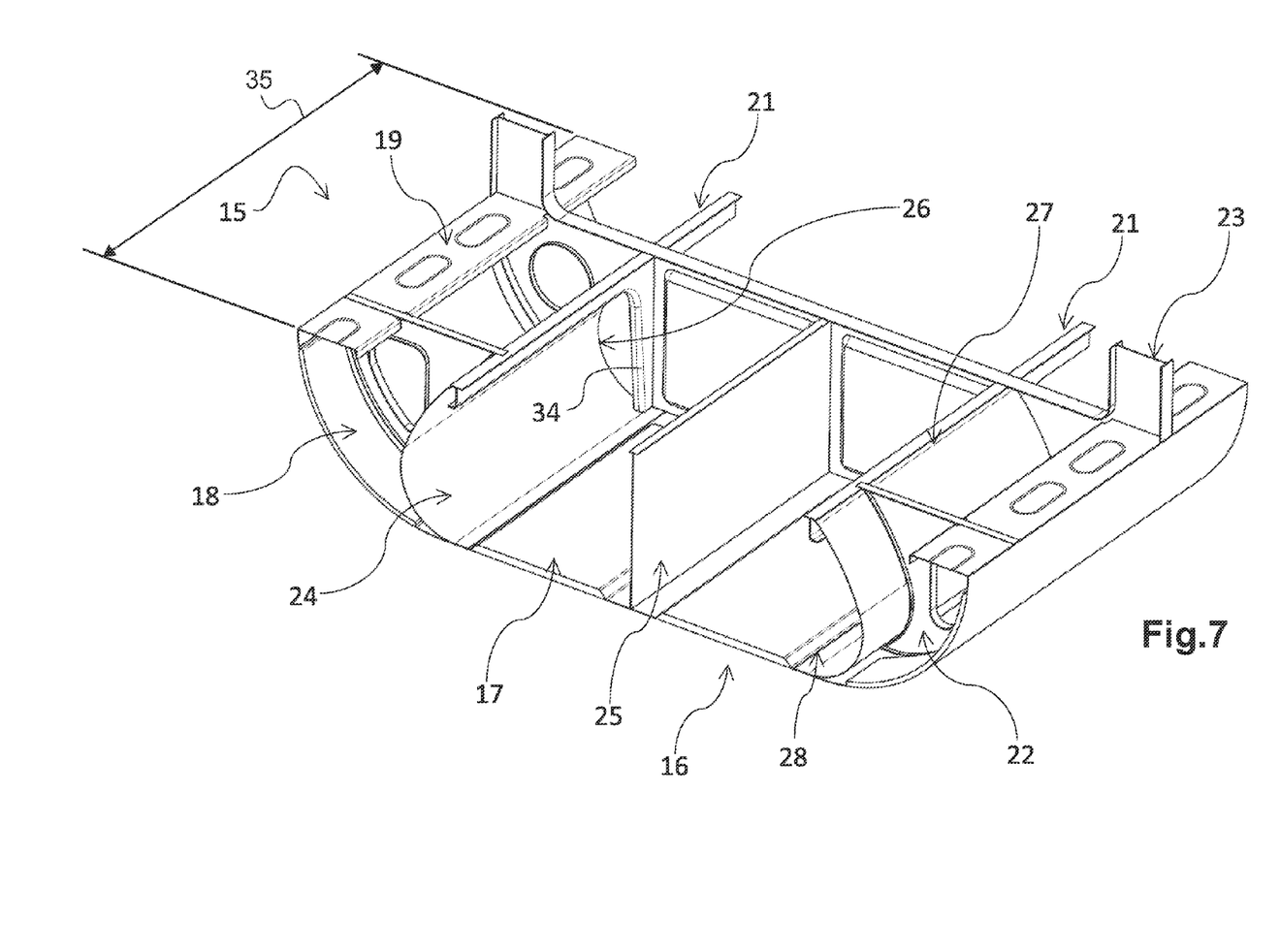
FIG. 7 shows a perspective view of another airframe longitudinal section, devoid from longerons and according to the invention.

According to FIG. 7 corresponding features are referred to with the references of FIGS. 1-6. The membrane elements 24 are of a bulgy shape i.e. of an upwardly transversal C shape having a hollow side turned towards the interior of the subfloor structure 15. The membrane elements 24 are attached at their upper longitudinal hem 27 to the longitudinal support beams 21 and at their lower longitudinal hem 28 to the integral bottom shell 16. The longitudinal support beam 21 and the floor panels (not shown) react the membrane loads of the membrane elements 24 at their upper hems 27 and distribute them to the adjacent main frames 23 or ribs 20.

The membrane loads at the lower membrane hem 28 are tangentially introduced to the bottom shell 16. The curved ends 26 of the membrane element 24 are not coupled to the adjacent main frame 23 or rib 20, in order to ensure a purely two dimensional stress state of the membrane element 24. On FIG. 7, the prior art longerons are eliminated only along a longitudinal section 35 of the longitudinal axis 33. Here, the longitudinal support beams 21 and membrane elements 24 are solely replacing the prior art longerons along the longitudinal section 35 of the structure 15 in the airframe 2. In other embodiments of the invention, the prior art longerons (8) are fully eliminated all along the whole length of the structure 15, in the longitudinal axis 33 of the airframe 2.

Additional intermediate lateral ribs 22 are used mainly as to support the end panels 19, the lateral curved shell portions 18 and the longitudinal support beams 21. A flat tank separation web 25 is provided to separate the tank volume between two longitudinal support beams 21 in two individual compartments.

Figure 8:
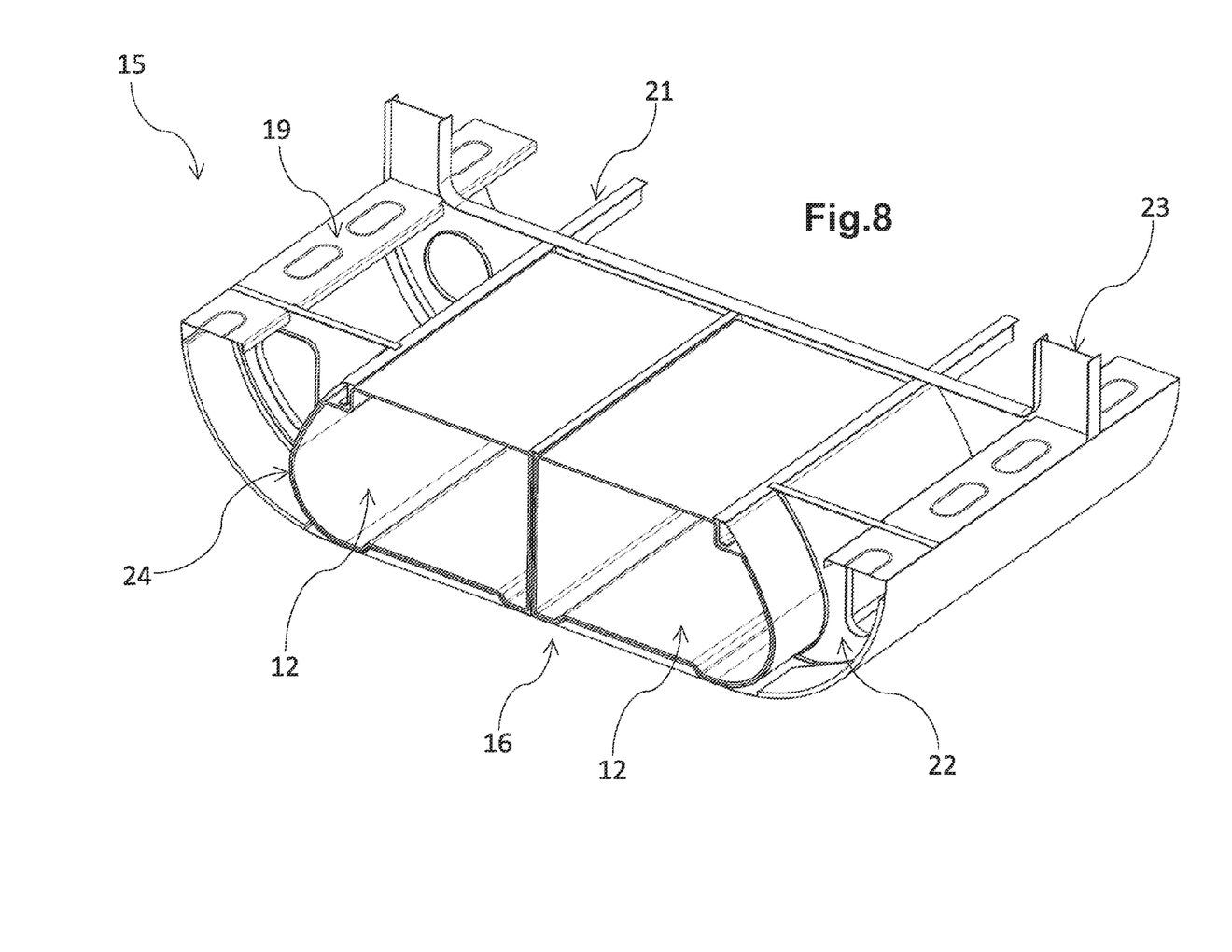
FIG. 8 shows a further perspective view of the section of FIG. 7.

According to FIG. 8 corresponding features are referred to with the references of FIGS. 1-7. Tank bladders 12 are implemented in the integral subfloor structure 15.

Figure 9:
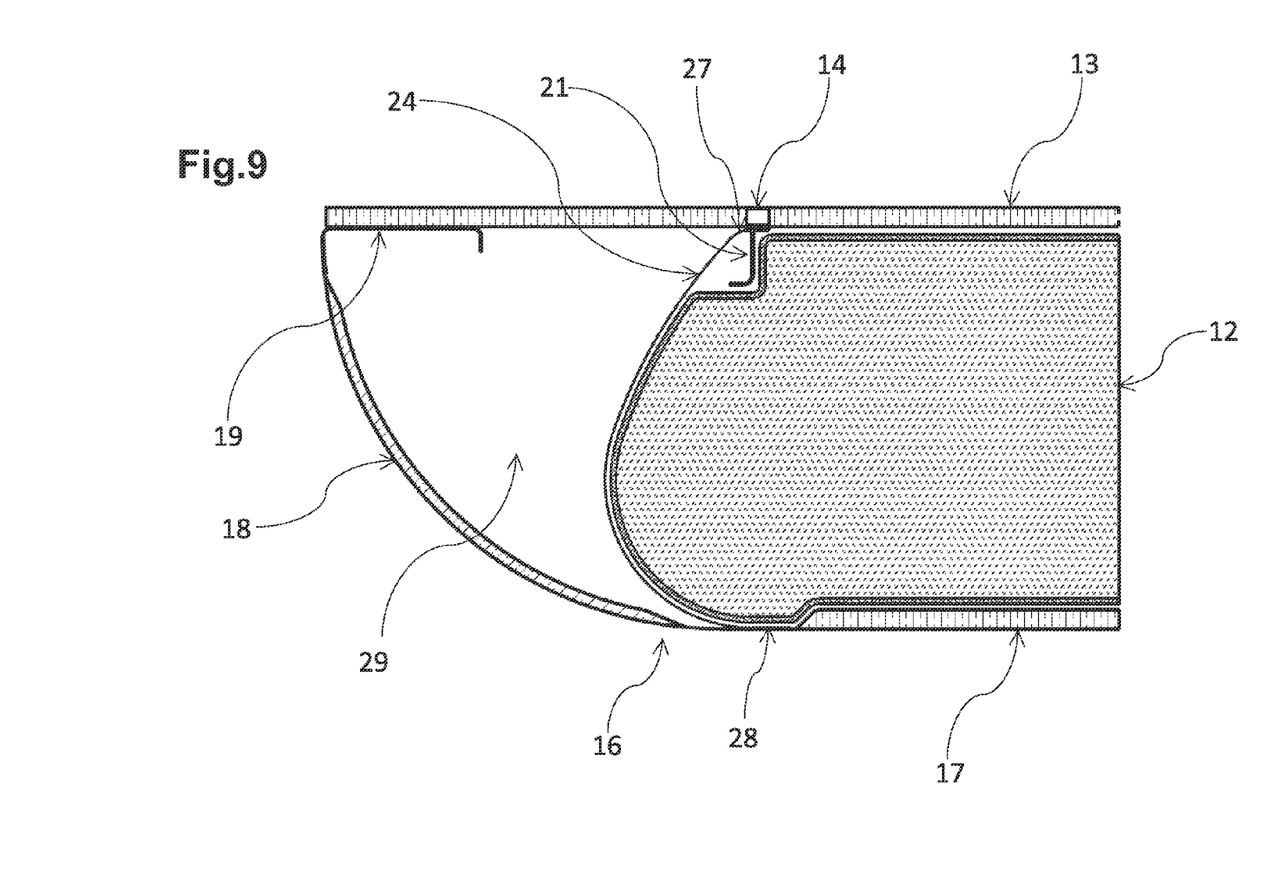
FIG. 9 shows a cross sectional view of the section of FIGS. 7 and 8.

According to FIG. 9 corresponding features are referred to with the references of FIGS. 1-10. The tank compartment of the integral subfloor structure 15 is confined by the floor panel 13, the bottom shell 16 and laterally by the membrane element 24. The tank bladder 12 rests on the flat shell portion 17 and on the membrane element 24. The upper membrane hem 27 is attached to the longitudinal support beam 21 and to the floor panel 13. The lower membrane hem 28 is attached to the bottom shell 16. The cross section of the longitudinal support beam may have closed profile sections.

Seat rails 14 on the floor panels 13 are allocated coincident to the longitudinal support beams 21, and integrated to the longitudinal support beams 21 in order to increase their moment of inertia. The free volume 29 enclosed by the membrane element 24, the lateral curved shell portion 18 and the floor panel 13 is preferably used for systems integration.

REFERENCE LIST

1. Rotary wing aircraft
2. Airframe
3. Subfloor group
4. Bottom Shell
5. Flat bottom shell portion
6. Lateral curved side shell portion
7. Framework
8. Longerons
9. Central rib
10. Lateral rib
11. Main frame
12. Fuel tank bladder
13. Floor panel
14. Seat rail
15. Integral subfloor group
16. Bottom Integral shell
17. Flat shell portion of the integral shell
18. Lateral curved shell portion of the integral shell
19. End panels
20. Rib
21. Longitudinal support beams
22. Intermediate lateral rib
23. Continuous main frame
24. Membrane
25. Tank separation web
26. Membrane curved end
27. Upper longitudinal membrane end
28. Lower longitudinal membrane end
29. Lateral systems integration volume
30. Floor plane
31. Outer aircraft loft
32. Cruciform intersection
33. Longitudinal axis
34. Front flanges
35. Longitudinal section (devoid from longerons)
36. Attachment for floor panels
37. Flat top edges

What is claimed is:

1. An airframe for a rotary wing aircraft, the rotary wing aircraft having a longitudinal axis and comprising:
    a subfloor structure for supporting cabin floor panels, the subfloor structure having a bottom shell, ribs, main frames and floor panels, the ribs and main frames extending essentially in planes perpendicular to the longitudinal axis on one side of the bottom shell and the floor panels being in an essentially horizontal plane essentially parallel to the longitudinal axis on the same side of the bottom shell as the ribs and main frames and mounted on flat top edges of the ribs and of main frames; the flat top edges being opposite in position to the bottom shell, the bottom shell having an essentially flat shell portion including longitudinally oriented sides and two curved lateral shell portions extending integrally from said flat shell portion along the longitudinally oriented sides and being curved towards respective lateral borders of said ribs and main frames;
    longitudinal support beams along at least a longitudinal section of the subfloor structure along the longitudinal axis, the longitudinal support beams provided with attachments for the floor panels, the longitudinal support beams being attached to at least one of the ribs and the main frames and featuring along at least ⅔ of their longitudinal extension a height 2 to 20 times smaller than a corresponding adjacent distance between the floor panel and the bottom shell; and
    at least a pair of membrane elements of bulgy shape; each membrane element laterally protruding to the outside of the longitudinal support beams one each side of the subfloor structure; each membrane element being provided with an upper longitudinal hem attached to said longitudinal support beams and a lower longitudinal hem attached to the bottom shell; the membrane elements being attached to the longitudinal support beams for purely two-dimensional loading of the membrane elements.

2. The airframe according to claim 1, wherein each membrane element laterally extends beyond the upper longitudinal hem and a lower longitudinal hem into a free volume; each membrane element of bulgy shape having an upwardly transversal C shape having a hollow side turned towards an interior of the subfloor structure.

3. The airframe according to claim 1, wherein the membrane element is made of a flexible or semi-rigid material, the material comprising at least one one of fabric, cloth, mesh, plastic, and fiber reinforced plastic, the material featuring a thickness of 0.1 mm to 3 mm.

4. The airframe according to claim 1, wherein the planes of the ribs and/or the main frames extending essentially perpendicular to the longitudinal support beams are orthogonal or slanted with regard to the essentially horizontal plane of the floor panels.

5. The airframe according to claim 1, wherein end panels are provided in the essentially horizontal plane of the floor panels essentially longitudinally along a top end of the two lateral shell portions.

6. The airframe according to claim 5, each end panel being integral respectively with one of the two lateral shell portions and pointing towards an inside of the subfloor structure.

7. The airframe according to claim 1, wherein the longitudinal support beams are functionally and physically integrated within the curved lateral shell portions of the bottom shell without any interruptions.

8. The airframe according to claim 1, wherein the ribs are continuous and extend from the flat shell portion of the bottom shell to the floor panels and laterally enclose the whole width of the bottom shell being attached to their lateral curved shell portions.

9. The airframe according to claim 1, wherein the main frames are continuous and extend from the flat shell portion of the bottom shell to the floor panels and laterally enclose the whole width of the bottom shell being attached to their lateral curved shell portions.

10. The airframe according to claim 1, wherein intermediate lateral ribs are provided supporting end panels, lateral curved shell portions and/or the longitudinal support beams.

11. The airframe according to claim 1, wherein at least one flat tank separation web is provided extending from the flat shell portion of the bottom shell to the floor panels and longitudinally between the ribs and/or the main frames.

12. The airframe according to claim 1, wherein seat rails are provided allocated coincident to the longitudinal support beams and are integrated to the longitudinal beams.

13. A rotary wing aircraft including an airframe according to claim 1, wherein at least a longitudinal section of the structure is longerons free.

14. A rotary wing aircraft including an airframe according to claim 1, wherein the structure is longerons free all along the length of the structure, in the longitudinal axis of the airframe.

15. An airframe for a rotary wing aircraft comprising:
   a bottom shell having a flat shell portion and two curved lateral shell portions, each lateral shell portion extending outwardly from the flat shell portion;
   a series of ribs and main frames extending in planes perpendicular to a longitudinal axis of the rotary wing aircraft and on one side of the shell, each rib and main frame having a flat top edge positioned on an end of the rib and main frame opposite to the bottom shell, wherein the two lateral curved shell portions are curved towards respective lateral borders of the series of ribs and main frames;
   floor panels in a horizontal plane parallel to the longitudinal axis and on the one side of the shell, the floor panels mounted to the flat top edges of the ribs and main frames, wherein the bottom shell, the series of ribs and main frames, and the floor panels cooperate to form a subfloor structure to support cabin floor panels;
   first and second longitudinal support beams, each longitudinal support beam extending along the longitudinal axis and along at least a longitudinal section of the subfloor structure, each longitudinal support beam having an upper region with attachments for the floor panels, each longitudinal support beam having a series of front flanges spaced apart from one another and extending from the floor panels to the bottom shell, each longitudinal support beam having a height between adjacent front flanges being 2 to 20 times smaller than a height of an adjacent front flange such that an opening is defined within the region, each longitudinal support beam being connected to at least one of the ribs and main frames;
   first and second membrane elements, each membrane element having an upper longitudinal hem connected to the upper region of a respective longitudinal support beam and a lower longitudinal hem connected to the bottom shell for purely two-dimensional loading of the membrane element, each membrane element having a C-shaped cross sectional shape with a concave hollow side, the concave hollow sides of the first and second membrane elements facing one another, each membrane element protruding towards an adjacent lateral curved shell portion.

16. The airframe according to claim 15 wherein the first and second membrane elements are disconnected from adjacent ribs and main frames.

17. The airframe according to claim 15 wherein a fuel tank compartment is defined between the first and second membrane elements, the bottom shell, and the floor panels; the airframe further comprising:
   a fuel tank bladder positioned within the fuel tank compartment, the fuel tank bladder resting on the flat shell portion of the bottom shell and on the first and second membrane elements.

18. The airframe according to claim 15 wherein a fuel compartment is defined between the first and second membrane elements, the bottom shell, and the floor panels, the airframe further comprising:
   a flat tank separation web extending longitudinally and separating the fuel compartment into two individual compartments; and
   first and second fuel tank bladders, each bladder positioned within a respective one of the two individual compartments and resting on the flat shell portion of the bottom shell and on a respective one of the first and second membrane elements.

19. The airframe according to claim 15 wherein the lower longitudinal hem of each membrane element is connected to the bottom shell such that membrane loads at the lower membrane hem are tangentially introduced to the bottom shell.

20. The airframe according to claim 15 wherein each membrane elements comprises a non-rigid material.

* * * * *